Sept. 29, 1964   K. H. STEIGERWALD   3,151,231
METHOD AND APPARATUS FOR WELDING WITHIN AN
ENCLOSURE BY MEANS OF A BEAM
OF CHARGED PARTICLES
Filed Jan. 24, 1961   4 Sheets-Sheet 1
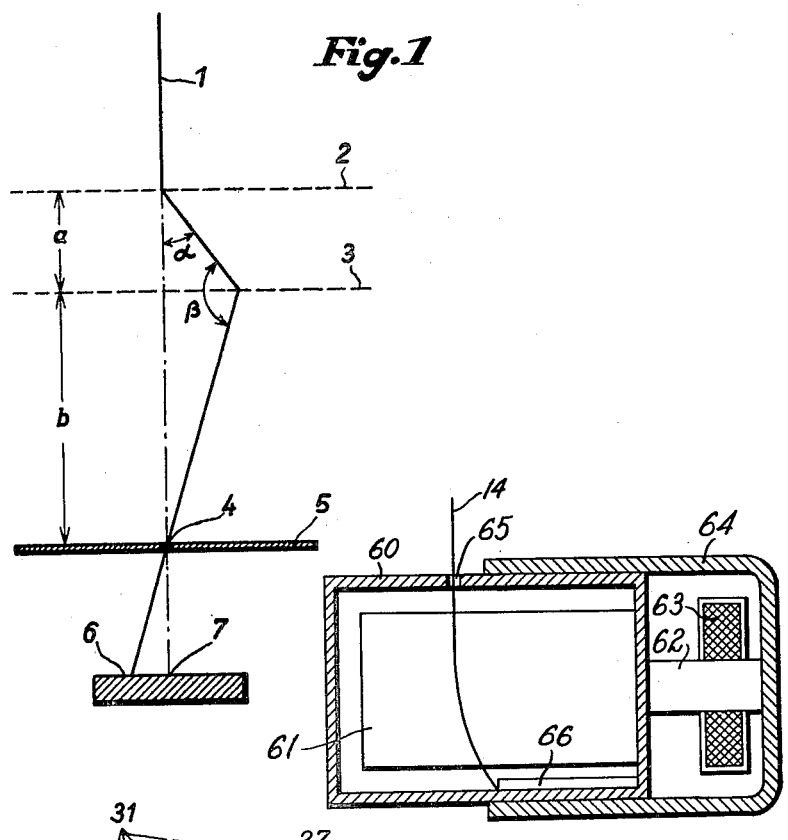
Fig.1
Fig.8
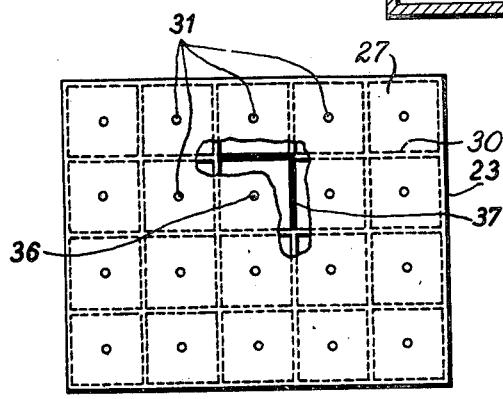
Fig.4
INVENTOR.
KARL HEINZ STEIGERWALD
BY
Attorneys

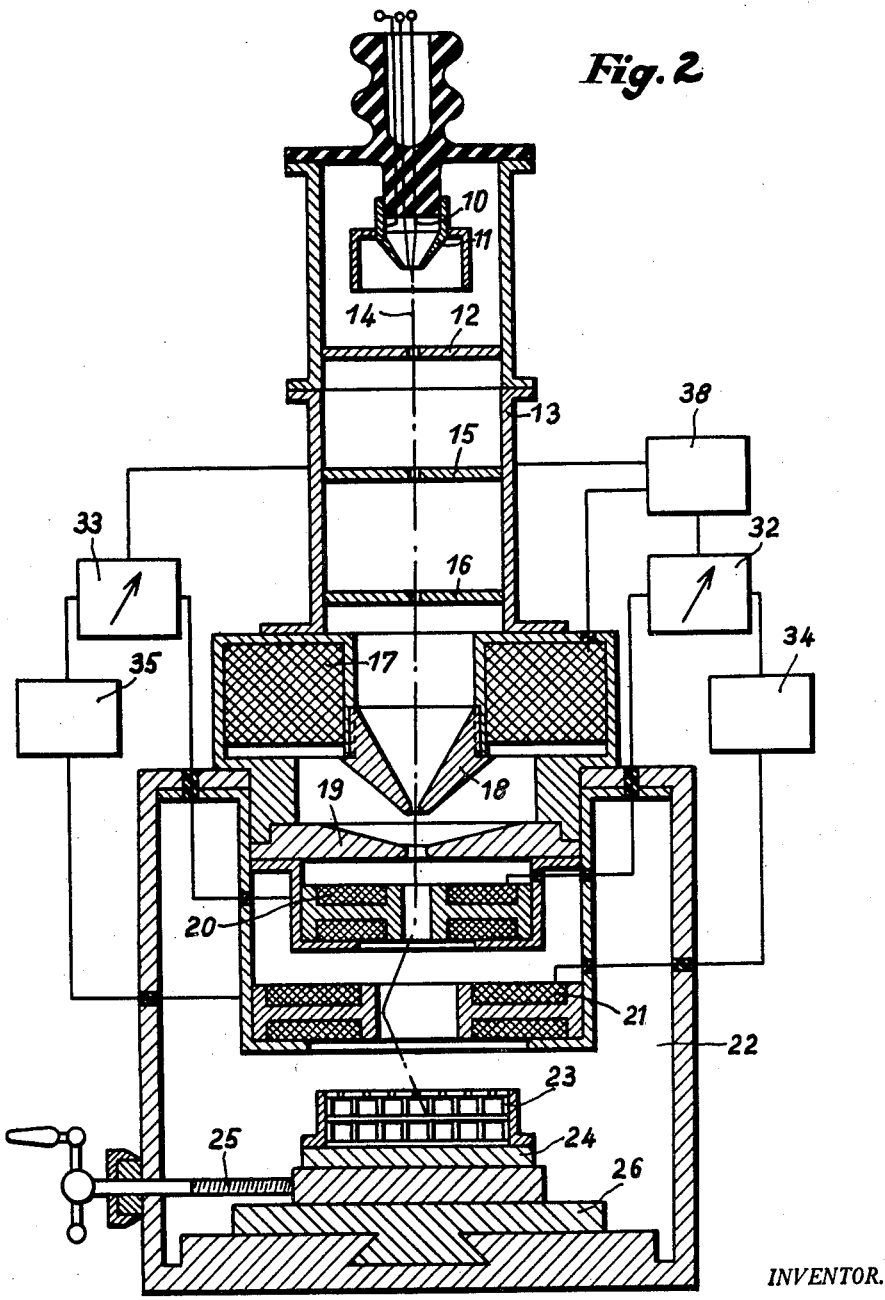

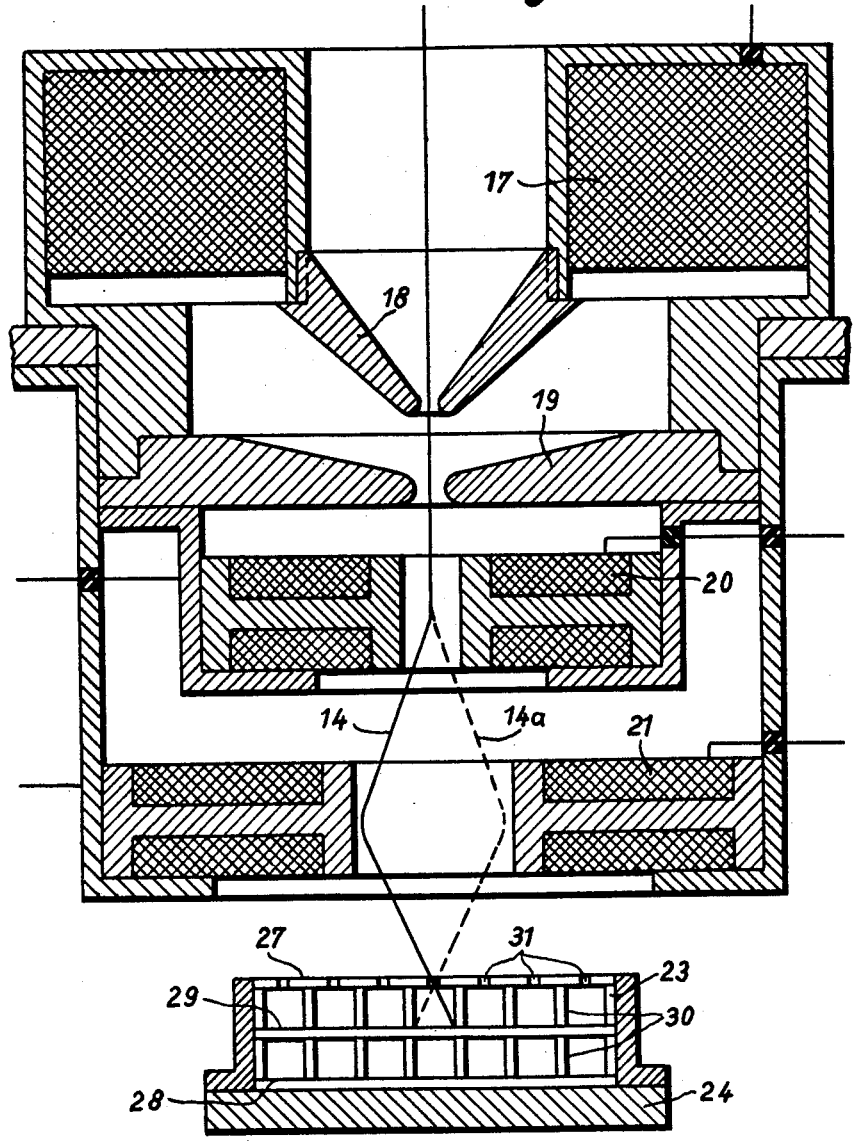

![United States Patent Office — 3,151,231 — Patented Sept. 29, 1964]

3,151,231
METHOD AND APPARATUS FOR WELDING WITHIN AN ENCLOSURE BY MEANS OF A BEAM OF CHARGED PARTICLES

Karl Heinz Steigerwald, Heidenheim (Brenz), Germany, assignor, by mesne assignments, to United Aircraft Corporation, East Hartford, Conn., a corporation of Delaware
Filed Jan. 24, 1961, Ser. No. 84,629
Claims priority, application Germany, Feb. 27, 1960, Z 7,844
8 Claims. (Cl. 219—121)

This invention relates to welding and, more particularly, relates to the method and apparatus for welding within an enclosure by means of a beam of charged particles.

In the assembly of complicated structures, such as "honeycomb" reinforced structures, it is often necessary to weld together structural elements which are enclosed within the interior of the assembly. Present arc and deposit welding are generally limited to a directly accessible location. Therefore, in the fabrication of complicated structures, the elements can be welded together only with great difficulty and cost in assembly and, in many cases, cannot be welded at all.

Welding by means of a focussed beam of charged particles has been disclosed to the art in my copending application entitled, Method and Device for Working Materials by Means of a Beam of Charged Particles, Serial No. 774,745, filed November 18, 1958, now Patent No. 2,989,614. Such welding procedures have many advantages based in large measure on the decreased thermal stressing of the piece to be welded.

It is the object of this invention to provide an improved method of welding, by a beam of charged particles, parts enclosed within an overlying structure.

It is a further object of this invention to provide improved apparatus for welding of parts enclosed within and hidden by overlying structures.

In accordance with these objects, there is provided, in accordance with a preferred embodiment of this invention, a source of charged particles. Means are provided to focus the charge carrier beam in a beam having an energy density sufficient to effect welding of the material upon which it impinges. An aperture is provided in the structural assembly and the beam focussed upon the location of the desired weld through said aperture. The aperture may be very small so that the strength of the assembly is not perceptibly reduced. For example, since the beam diameter is ordinarily within the range of about 30–200 microns in diameter, an aperture having a diameter between $\frac{1}{10}$ and 1 mm. is sufficient to allow entry of the beam.

If the weld to be produced within the enclosed structure is of the nature of a seam, the peripheral dimension of which is extensive in comparison with the diameter of the aperture for passage of the beam, it is advantageous to deflect the beam about a point located within said aperture. In this manner, a large region within the assembled structure can be covered by the impinging beam through an aperture of very small diameter.

If the assembly to be welded consists of non-magnetic material, I prefer to provide a deflecting system for deflection of the beam, which system is positioned on the outside of the assembled structure. In such embodiment, the beam generating system is positioned so that the beam axis and the aperture through which the beam passes coincide. Thus, in such embodiment, the beam is deflected only within the assembled structure to effect the desired welding.

In the event that the assembled structure can be provided with large apertures, but the location of the desired weld cannot be hit by the beam of charged particles entering through such an aperture. A deflection system may be introduced into the interior of the assembled structure through the larger aperture to controllably deflect a beam entering the structure through a smaller aperture near the location of the desired weld. In this embodiment, the beam is deflected within the assembled structure to impinge upon the location of the desired weld.

In applications in which the structure is composed of ferro magnetic material, it is often desirable to attach electromagnetic coils to the structure itself, the coil positioning and field strengths established thereby providing a magnetic field to deflect the charge carrier beam to the desired weld location.

Where several layers of the structure are interposed between the source of the beam and the location to be welded, it is useful to provide aligned apertures through the several structure layers to admit the beam to the structure interior and to deflect the beam by a deflection system operable within the structure. In those cases where such deflection system insertion is not feasible, it is usually advantageous to provide apertures in the structure layers which are aligned in a straight line from the desired weld location and to deflect the beam outside of the workpiece to pass through successive apertures until it impinges upon the location of the desired weld.

In many applications, it is advantageous to utilize the charge carrier beam for the production of the aperture. In such applications, the charge carrier beam is focussed upon the enclosed structure to perforate the structure. Thereupon, the beam is refocussed upon the location of the desired weld. In such application, it is often desirable to seal the structure by utilizing the charge carrier beam energy to melt additional material supplied at the aperture and to join said additional material in a seal across the aperture.

The fact that the beam can be employed for perforating the structure and sealing such perforation after welding permits automatic cycling of the welding process. In such applications, it is advantageous to utilize a programmed control to enable automatic control of the entire welding process; that is, to first perforate the outer part of the assembled structure, to control the welding of the desired seams and points within the structure, to transport additional material to the perforation in the cover of the assembled structure, and finally to weld this additional material over the perforation thereby to reseal the structure.

During the performance of welding in accordance with this invention, it is advantageous in many applications to control the beam thereby to make the beam impinge in an intermittent fashion. In such manner, it is possible to produce extremely deep welds without noticeable evaporation of material by the impinging energy. If the beam intensity at the spot of inpingement is maintained at a value exceeding approximately $1 \cdot 10^6$ w./cm.$^2$, it has been found the beam will penetrate very deeply into the material and apply the incident energy along the entire depth of penetration to provide a very deep and narrow weld channel.

In those applications in which the structure consists of ferro magnetic materials and access to the interior suitable for the introduction of a deflection system therein is precluded, I found it advantageous to provide the beam generating system with at least two deflection systems arranged in separated planes along the axis of the beam and outside of the structure. An aperture is provided in the structure along the axis of the undeflected beam. The currents supplied to the two deflection systems are interrelated to deflect the impinging beam through the aperture, impinging upon the location of the desired weld. The interrelationship of the deflection currents supplied to the two deflection systems ensures that the beam always passes through the aperture. The resultant deflection of the two deflection systems causes the beam impingement upon the location to be welded.

In many applications, beam deflection is large, and beam defocussing is a possibility. In such applications, it is desirable to provide means for simultaneously adjusting the current in the focussing system in accordance with the selected amplitude of the deflection current to ensure that the incident welding beam is always properly focussed upon the desired location irrespective of the magnitude of deflection.

The invention will be more clearly understood by reference to the following description taken in conjunction with the accompanying drawings, of which:

FIG. 1 is a simplified diagram of a deflected beam useful in explanation of the present invention;

FIG. 2 is a cross section view of one embodiment of the present invention in which circuit components are shown in block diagram form;

FIG. 3 is an enlarged cross sectional view of a portion of the apparatus shown in FIG. 2;

FIG. 4 is a partially broken away plan view of the assembled structure shown in connection with FIGS. 2 and 3;

FIG. 8 is a cross section view of still another embodiment of this invention in which the structure to be welded consists of ferro magnetic material.

Figure 5:
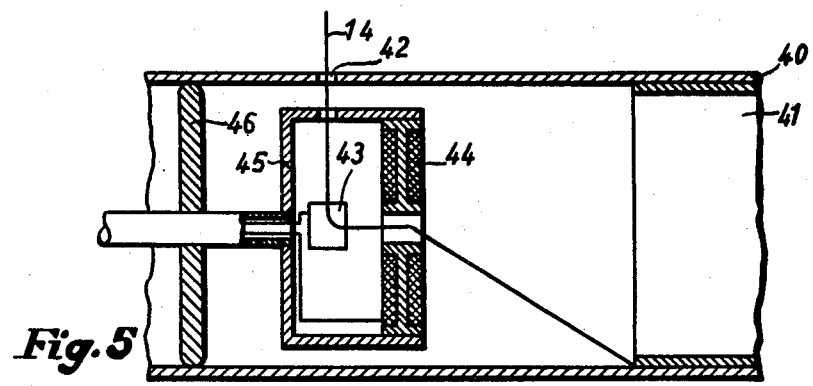
FIG. 5 is a cross section view of another embodiment of this invention in which a deflection system is positioned within the structure to be welded.

In FIG. 1 there is shown a charge carrier beam 1 which passes through two deflection systems schematically illustrated by dashed lines 2 and 3. The angle of deflection produced by the first deflection system is designated $\alpha$ and the angle of deflection produced in the second deflection system 3 is designated $\beta$. The beam, after passing through the two deflection systems, passes through an aperture 4 in the cover of a structure to be assembled and impinges upon the spot 6 to be welded within the assembled structure. The position of impingement of the undeflected beam is represented at 7. If the distance between the two deflection systems 2 and 3 is represented by $a$ as marked and the distance between the second deflection system 3 and the surface 5 of the workpiece is represented by $b$, the relationship between the angles of deflection may be represented by Equation 1, if the charge carrier beam is to pass through the aperture 4 in the plate 5 irrespective of the angle of deflection $\alpha$ selected.

*Equation 1*

$$\tan \beta = -\frac{\tan \alpha \ (1+a/b)}{1-a/b \ \tan^2 \alpha}$$

Thus, the distance of the incident beam 6 from the point of incidence 7 of the non-deflected beam is controlled by selection of the angle of deflection $\alpha$.

Equipment utilizing this deflection arrangement is shown in FIG. 2.

In FIG. 2 there is shown a beam generating system having a cathode 10, control electrode 11 and anode 12. The beam generating system is located within a grounded, evacuated housing 13. The electron beam 14 is shaped by the two adjustably positioned diaphragms 15 and 16.

A focussing lens is provided. The lens comprises coil 17 acting through an upper pole piece 18 and lower pole piece 19 to generate an adjustable focussing field to focus the beam upon the desired point of impingement.

Below the lens there is provided a first deflection system 20 consisting of four diagonally opposed electromagnetic coils, each of which is fitted with a core of high permeability material. Below the deflection system 20 there is provided a second deflection system 21 constructed in the same manner as system 20. The working chamber 22 is provided with a stage 24 upon which the structure to be welded 23 is fixedly mounted. The stage 24 is movable by means of spindle 25 in the plane of the paper and into and out of the plane of the paper by movement of table 26 which is moved by a similar spindle (not shown).

As may be more particularly seen by reference to FIGS. 2, 3 and 4 simultaneously, the structure to be welded 23 comprises a cover plate 27, a base plate 28 and an intermediate plate 29. Vertically extending ribs 30 extend between the intermediate plate and the base and cover plates, which ribs are to be welded to the respective plates to provide the desired assembled structure. For this welding, the ribs 30 are first welded between plates 28 and 29. Then the cover plate 27 is welded to the upper ribs 30 and finally the upper ribs are welded to the plate 29. For illustration of the process in accordance with this invention, the last-named operation will be utilized as an example. For this purpose, the cover plate 27 is provided with a plurality of apertures 31 through which the electron beam 14 is passed to impinge upon the location of the desired weld on the plate 29.

For the purpose of providing a deflection current to the coordinate axis of the deflection system 20, there is provided sources of controllable current 32 and 33 respectively. Sources 34 and 35 provide the deflection currents for the respective coordinate axes of deflection system 21 and are responsive to the settings of the sources 32 and 33 respectively so that the deflection currents in the two deflection systems are interrelated in accordance with the relationship established by Equation 1. Therefore, the electron beam 14 will always pass through the aperture 31 in the cover plate 27 independently of the beam angle of deflection. For example, the electron beam 14 and 14a both pass through the respective aperture 31 despite the different angles of deflection thereof.

For welding of the rib to the plate 29, the electron beam 14 is controlled so that upon passing through the aperture 36 in cover plate 27, it will impinge as shown by the imprinted path line 37 in FIG. 4, thereby welding the rib 30 to the plate 29 along this path. Since the variation in the deflection and the resultant variation of path length to the point of impingement will effect the focussing of the electron beam, there is provided a variable source 38 responsive to the amplitude of the deflection currents established by deflection sources 32 and 33 to vary the amplitude of the focussing field established by lens 17 to maintain optimum focussing of the beam upon the point of impingement despite the magnitude of beam deflection.

In many applications, it is desirable to program the welding as for example in accordance with a digital control program. In such applications, the deflection currents can be determined in accordance with a programmed determination of deflection values. Similarly, it is often advantageous to automatically move the workpiece 23 in such manner as to align a new hole 31 with the beam axis after completion of the welding of the preceding rib structure.

In many applications, it will be impossible to reach all positions within the interior of the structure. In many of these applications, however, the deflection system may be introduced within the interior of the structure itself. Exemplary of such applications is the apparatus shown in FIG. 5.

In FIG. 5 there is shown a structure to be welded consisting of a tube 40 enclosing tube 41. An aperture 42 is provided in the exterior of the tube through which electron beam 14 enters the interior of the structure. For control of the position of impingement of the beam, there is provided a deflection system within the interior of the plate consisting of a first deflection system having pole pieces arranged at right angles to the plane of the paper of which the pole piece 43 alone is visible in the cross section. In the first deflection system, the beam is deflected to be substantially coincident with the axis of the tube 40. The second deflection system 44 is of conventional form having four deflection coils arranged along coordinate axes perpendicular to the axis of the tube. By suitably controlling the amplitudes of the deflection currents supplied to the deflection system 44, the electron beam may be deflected to describe a conical envelope having the tube axis as the centerline thereof. The base of the cone is coincident with the position of the end of tube 41 thereby to weld the tubes 40 and 41 together along the entire circumference.

The deflection systems 43 and 44 are positioned within a carrier 45 for introduction within the interior of tube 40. The carrier provides means for withdrawing the necessary electrical leads to the deflection system coils and is provided with a plurality of discs 46 to serve as guides within the tube 40. It will be noted that the deflection systems 20 and 21 of the equipment shown in FIG. 2 may be omitted in applications in which the equipment shown in FIG. 5 is utilized. The tube 40 will be supported directly upon a mechanical stage within the working chamber 22 (suitably enlarged if necessary) and the stage is positioned so that the aperture 42 is coincident with the axis of the undeflected beam 14.

Figure 6:
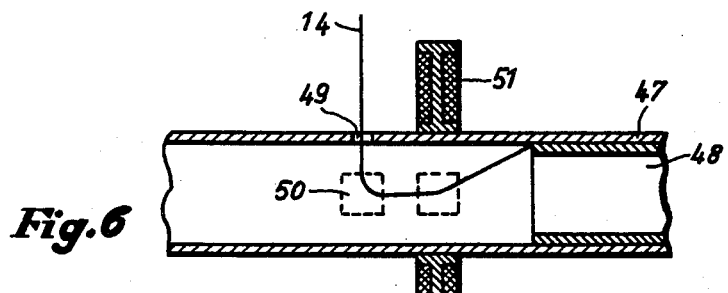
FIG. 6 is a cross section view taken through still another embodiment of this invention in which a deflection system, positioned outside of the structure to be assembled, generates a deflecting field within the structure.

In those applications in which tubes of non-magnetic material are to be welded, the embodiment shown in FIG. 6 may advantageously be employed.

In FIG. 6 there is shown a tube 47 of non-magnetic material to which is to be welded tube 48. Deflection systems are arranged outside of the tube 47 along mutually perpendicular coordinate axes. The first deflection system comprises two deflection coils arranged at right angles to the plane of the paper of which coil 50 only is shown. The second deflection system 51 comprises four diametrically opposed deflection coils of conventional construction. The tube 47 is provided with an aperture 49 through which the electron beam 14 enters the tube. The beam is deflected within the tube in similar fashion as set forth in connection with the explanation of the operation of the equipment shown in FIG. 5. Similarly, the tubes are mounted upon the mechanical stage with the aperture 49 coinciding with the axis of the undeflected beam 14 and the exterior deflection stages 20 and 21 of FIG. 2 may be omitted.

In many applications, several elements may be interposed between the beam source and the area to be welded. In such applications, the embodiment shown in FIG. 7 may advantageously be employed.

Figure 7:
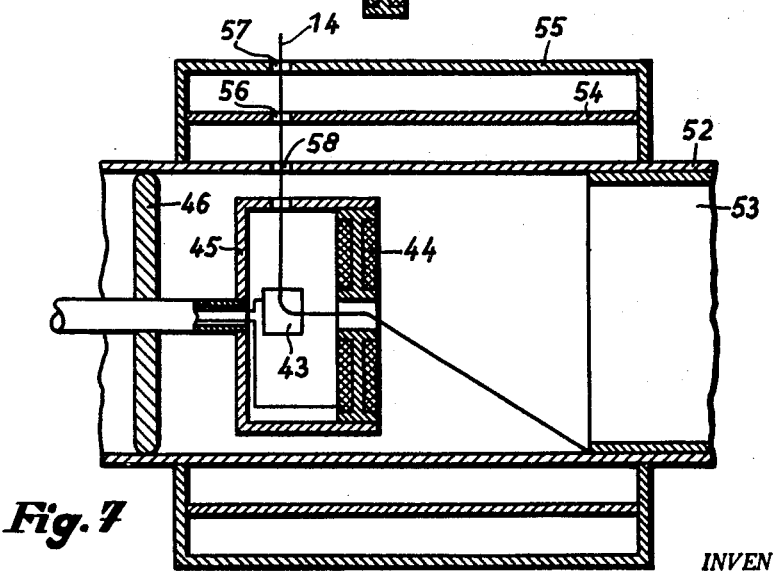
FIG. 7 is a cross section view of still another embodiment of this invention in which several structural elements are interposed between the beam source and the location of the desired weld.

In FIG. 7 there is shown a tube 52 to which is to be welded tube 53. The weld area is covered by two cylindrical external chambers defined by walls 54 and 55 respectively. In such applications, the apertures 56, 57 and 58 are provided respectively in walls 54, 55 and 52 which apertures are aligned with the axis of the undeflected beam 14. The beam entering through the apertures is deflected by deflection systems 43 and 44 to weld the tubes along the circumference thereof in the same manner as set forth in consideration of FIG. 5.

In some applications, it may be advantageous that the apertures 56, 57 and 58 be arranged at an angle to the beam axis. In such applications, the deflection systems 20 and 21 of FIG. 2 will be required to deflect the electron beam so that it passes through the apertures before entering the deflection systems 43 and 44 within the tube.

In FIG. 8 there is shown a section taken near the wall of a square chamber 60 made of ferro magnetic material. Within the chamber there is arranged a chamber 61 consisting of ferro magnetic material which projects from chamber 60 by an extension 62. A coil 63 is positioned on the extension 62 to produce a magnetic field between the walls of the chambers 60 and 61. A sleeve 64 frictionally engaging the outside of the chamber 60 completes the magnetic circuit.

The electron beam 14 enters the chamber through aperture 65 and is deflected by the magnetic field formed between chamber 61 and the wall of chamber 60 to impinge upon the terminal edge of the part 66 to be welded to chamber 60. By control of the currents supplied to the coil 63, the angle of deflection of the electron beam 14 can be varied to produce a welded seam which coincides, for predetermined ranges, with the terminating edge of the part 66.

This invention may be variously embodied and modified within the scope of the subjoined claims.

What is claimed is:
1. Apparatus for welding structural parts enclosed within a cover plate having a small aperture therein comprising means to generate a beam of charged particles, said generating means positioned with the axis of said beam passing through said aperture, and means to deflect said beam to pass through said aperture, to impinge on the position of the desired weld on the enclosed structural parts and to move the position of impingement of the beam along a weld seam which is elongated as compared with the diameter of said aperture.

2. Apparatus in accordance with claim 1 in which said deflection means comprises a deflection system removably inserted within the enclosing cover plate.

3. Apparatus in accordance with claim 1 in which said deflecting means comprises an adjustable field set up within said cover plate between structural parts of magnetic material.

4. Apparatus in accordance with claim 1 which includes means responsive to the amplitude of beam deflection for focussing the beam on the impingement position.

5. The method of welding structural parts enclosed within a cover plate having a small aperture therein which consists of the steps of directing a beam of charged particles through said aperture and deflecting said beam to impinge structural parts at the position of the desired weld.

6. The method in accordance with claim 5 in which said beam is deflected about a point within said aperture.

7. The method in accordance with claim 5 which includes the step of deflecting the beam after the beam has passed through said aperture by a deflection field established beneath the cover plate.

8. Apparatus for welding structural parts enclosed within a cover plate having a small aperture therein comprising means to generate a beam of charged particles, said generating means positioned with the axis of said beam passing through the aperture, means to deflect said beam to pass through said aperture, to impinge on the position of the desired weld on the enclosed structural parts and to move the position of impingement of the beam along a weld seam which is elongated as compared with the diameter of said aperture, said last named means comprising a first and second deflection system positioned at separated locations along the axis of said beam, a first source of adjustable current coupled to said first deflection system to control the deflection field established by said first deflection system, and a second source of current coupled to said second deflection system to control the deflection field established by said second deflection system, said second source being responsive to the amplitude of the current of said first source to ensure passage of said beam through said aperture.

References Cited in the file of this patent
UNITED STATES PATENTS

| | | |
|---|---|---|
| 2,058,914 | Rudenberg | Oct. 27, 1936 |
| 2,819,380 | Eaton | Jan. 7, 1958 |
| 3,033,974 | Schleich et al. | May 8, 1962 |